(12) United States Patent
Ono

(10) Patent No.: US 6,640,676 B2
(45) Date of Patent: Nov. 4, 2003

(54) TOOL PRESETTER AND TOOL OFFSET AMOUNT CALCULATION METHOD

(75) Inventor: Katsuaki Ono, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/044,978

(22) Filed: Jan. 15, 2002

(65) Prior Publication Data

US 2002/0129681 A1 Sep. 19, 2002

(30) Foreign Application Priority Data

Jan. 31, 2001 (JP) ........................... 2001-023230

(51) Int. Cl.[7] .............. B23B 1/00; B23B 5/00
(52) U.S. Cl. .............. 82/1.11; 82/118; 409/218; 408/3
(58) Field of Search .................. 82/118, 120; 409/218; 408/3

(56) References Cited

U.S. PATENT DOCUMENTS 4,755,949 A * 7/1988 Shiratori et al. ........... 700/192
6,232,736 B1 * 5/2001 Bullen ........................ 318/575

FOREIGN PATENT DOCUMENTS

JP 2000-141164 5/2000

* cited by examiner

Primary Examiner—A. L. Wellington
Assistant Examiner—Dana Ross
(74) Attorney, Agent, or Firm—Armstrong, Westerman & Hattori, LLP

(57) ABSTRACT

A tool presetter and a tool offset amount calculation method are provided which ensure easy and accurate determination of reference tool offset amounts in a machine tool having a pivotal tool spindle stock. The tool presetter is mounted in a composite lathe having a pivotal tool spindle stock 17. The tool presetter calculates tool offset amounts $Oz$ ($=A-Zm$), $Ox$ ($=B-Xm$) on the basis of machine coordinate values $Zm$, $Xm$ of the tool spindle stock detected when a nose of a tool T is in contact with Z-axis and X-axis detection points of a presetter sensor 18 with the tool spindle stock 17 pivoted by a pivot angle $\alpha$, and machine coordinate values A, B of the Z-axis and X-axis detection points of the presetter sensor 18, and calculates reference tool offset amounts $Lz$, $Lx$ from predetermined expressions on the basis of the tool offset amounts $Ox$, $Oz$ and the pivot angle $\alpha$ of the tool spindle stock 17.

8 Claims, 5 Drawing Sheets

TOOL PRESETTER AND TOOL OFFSET AMOUNT CALCULATION METHOD

BACKGROUND OF THE INVENTION

1. Field of the Invention

The present invention relates to a tool presetter to be mounted in a machine tool having a pivotal tool spindle stock, and to a tool offset amount calculation method for use in a machine tool of this type.

2. Description of Related Art

In recent years, some of composite lathes adapted for cutting, milling and drilling have been further adapted for oblique drilling. Such a composite lathe has a tool spindle stock to which various types of tools retained in a tool magazine are selectively attached in a detachable manner by means of an automatic tool changer (ATC).

The composite lathe of this type includes, for example, a headstock 12 fixedly provided at one end of a bed 11, and a tailstock 13 provided movably along the Z-axis at the other end of the bed 11 as shown in FIG. 3. A saddle 14 is provided movably along the Z-axis on the bed 11 between the headstock 12 and the tailstock 13. A column 15 movable forwardly and backwardly of the bed 11 is provided upright on the saddle 14, and a support base 16 for supporting a tool spindle stock 17 is provided movably along the X-axis on a slanted surface of the column 15. The tool spindle stock 17 is supported pivotally about a B-axis by the support base 16. Therefore, a tool spindle can be set at any given angle with respect to a main spindle by pivoting the tool spindle stock 17 about the B-axis in the composite lathe, so that an oblique drilling operation can be performed on a workpiece fixed to the main spindle.

The composite lathe is provided with a built-in tool presetter. When tool offset amounts are to be measured, a presetter arm (not shown) having a presetter sensor provided at a distal end thereof for contact with a tool nose is moved into a machining region toward the tool spindle stock 17 from the headstock 12.

Where the tool offset amounts are determined by means of the built-in tool presetter mounted in the composite lathe having the pivotal tool spindle stock 17, the tool spindle stock 17 is pivoted by −90 degrees so as to position the tool spindle parallel to the Z-axis as shown in FIG. 4 and, in this state, a nose of a tool T attached to the tool spindle stock 17 is brought into contact with a Z-axis detection point and an X-axis detection point of the presetter sensor 18 located at a predetermined position within the machining region, whereby Z-axis and X-axis machine coordinate values Zm, Xm of the tool spindle stock 17 are determined with the tool nose being in contact with the detection points of the presetter sensor 18. Then, reference tool offset amounts Lz, Lx are calculated on the basis of the machine coordinate values Zm, Xm and machine coordinate values A, B of the Z-axis and X-axis detection points of the presetter sensor 18. More specifically, the Z-axis reference tool offset amount Lz and the X-axis reference offset amount Lx are defined by A−Zm and B−Xm, respectively, in the built-in tool presetter. It is noted that the X-axis tool offset amount is on a diametrical basis in the lathe system, so that the X-axis reference offset amount is Lx ×2 in practical applications.

As described above, the tool spindle stock 17 is pivoted so as to position the tool spindle parallel to the Z-axis, and the tool nose is brought into contact with the presetter sensor 18 for the determination of the reference tool offset amounts Lz, Lx by means of the built-in tool presetter. Where a cutting tool as shown in FIGS. 5A and 5B is attached to the tool spindle stock 17 at an angle with respect to the tool spindle, for example, it is impossible to bring a nose of the tool into contact with the Z-axis and X-axis detection points of the presetter sensor 18, depending on the shape of the tool T and the shape of a tool holder H which holds the tool.

Even in the case of the tool T having such a shape, the tool nose may be brought into contact with the Z-axis and X-axis detection points of the presetter sensor 18 (see FIGS. 7A and 7B) by pivoting the tool spindle stock 17 as shown in FIG. 6. However, the conventional tool presetter is adapted to calculate the reference tool offset amounts Lz, Lx on the basis of the machine coordinate values A, B of the Z-axis and X-axis detection points of the presetter sensor 18 and the machine coordinate values Zm, Xm determined with the tool nose brought into contact with the detection points of the presetter sensor 18 by pivoting the tool spindle stock 17 by −90 degrees as described above. Therefore, it is impossible to accurately determine the reference tool offset amounts Lz, Lx even if the tool nose is brought into contact with the presetter sensor 18 by pivoting the tool spindle stock 17.

Where the reference tool offset amounts Lz, Lx are determined for the tool T of the aforesaid type, the tool nose cannot be brought into contact with the X-axis detection point of the presetter sensor 18 with the tool spindle being positioned parallel to the Z-axis for the determination of the X-axis tool offset amount Lx. Therefore, the tool nose is moved to the same level as the X-axis detection point while the tool nose is visually observed in the vicinity of the presetter sensor 18, and then the X-axis detection point is touched by a finger F or the like as shown in FIG. 8. Thus, the determination of the X-axis reference offset amount is achieved analogously to the case where the tool nose can be brought into contact with the X-axis detection point.

However, the X-axis reference tool offset amount Lx thus determined is not sufficiently accurate. Therefore, a sample workpiece is actually machined after the reference tool offset amount Lx thus determined is inputted in an NC machine, and then it is checked if the sample workpiece is properly machined. If the sample workpiece is not properly machined, the determined reference tool offset amount Lx is modified. This checking and modifying operation is troublesome.

In view of the foregoing, it is an object of the present invention to provide a tool presetter and a tool offset amount calculation method which ensure easy and accurate determination of reference tool offset amounts for a machine tool, such as the aforesaid composite lathe, which has a pivotal tool spindle stock.

SUMMARY OF THE INVENTION

In accordance with a first aspect of the present invention to achieve the aforesaid object, there is provided a tool presetter to be mounted in a machine tool having a pivotal tool spindle stock, the tool presetter comprising: a presetter sensor provided at a predetermined position; and control means which determines machine coordinate values of the tool spindle stock when a nose of a tool attached to the tool spindle stock is in contact with the presetter sensor and, on the basis of the machine coordinate values and a pivot angle of the tool spindle stock detected when the tool nose is in contact with the presetter sensor, calculates a reference tool offset amount as measured along a control axis with the tool spindle stock being set to position a tool spindle parallel to the control axis.

With this arrangement, the tool presetter calculates the reference tool offset amount as measured along the control axis with the tool spindle stock being set to position the tool spindle parallel to the control axis on the basis of the machine coordinate values determined when the tool nose is in contact with the presetter sensor and the pivot angle of the tool spindle stock detected when the tool nose is in contact with the presetter sensor. Therefore, there is no need to set the tool spindle stock to position the tool spindle parallel to the control axis when the tool nose is brought into contact with the presetter sensor, so that the tool nose contacting operation can more flexibly be performed.

Particularly in the case of a tool having a shape such that a tool nose thereof cannot be brought into contact with the presetter sensor with the tool spindle stock being set to position the tool spindle parallel to the control axis, a tool offset amount calculation method according to a second aspect of the present invention may be employed wherein, after the tool spindle stock is pivoted from a position at which the tool spindle is parallel to the control axis to bring the tool nose into contact with the presetter sensor, the machine coordinate values of the tool spindle stock are determined when the tool nose is in contact with the presetter sensor, and then the reference tool offset amount as measured along the control axis with the tool spindle stock being set to position the tool spindle parallel to the control axis is calculated on the basis of the machine coordinate values and the pivot angle of the tool spindle stock. With this arrangement, there is no need to perform the troublesome operation for checking and modifying the determined reference tool offset amount, unlike the tool offset amount calculation method employing the conventional tool presetter which cannot properly determine the reference tool offset amount unless the tool spindle stock is set to position the tool spindle parallel to the control axis. Thus, the inventive tool offset amount calculation method can assuredly and accurately determine the reference tool offset amount in a short time.

The foregoing and other objects, features and effects of the present invention will become more apparent from the following description of the preferred embodiment with reference to the attached drawings.

DESCRIPTION OF THE PREFERRED EMBODIMENT

Figure 1:
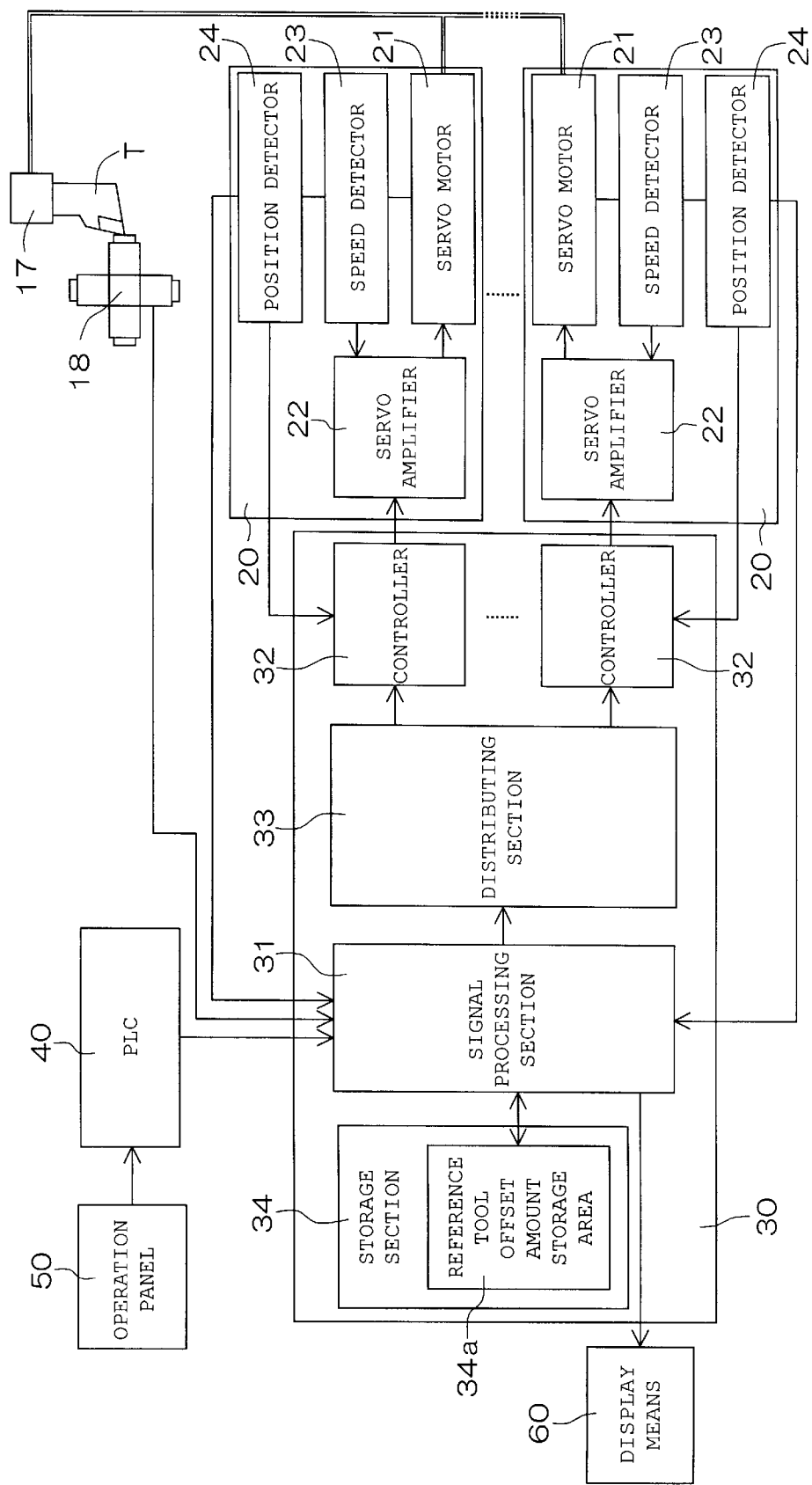
FIG. 1 is a block diagram illustrating a tool presetter mounted in a composite lathe having a pivotal tool spindle stock in accordance with one embodiment of the present invention.
Figure 3:
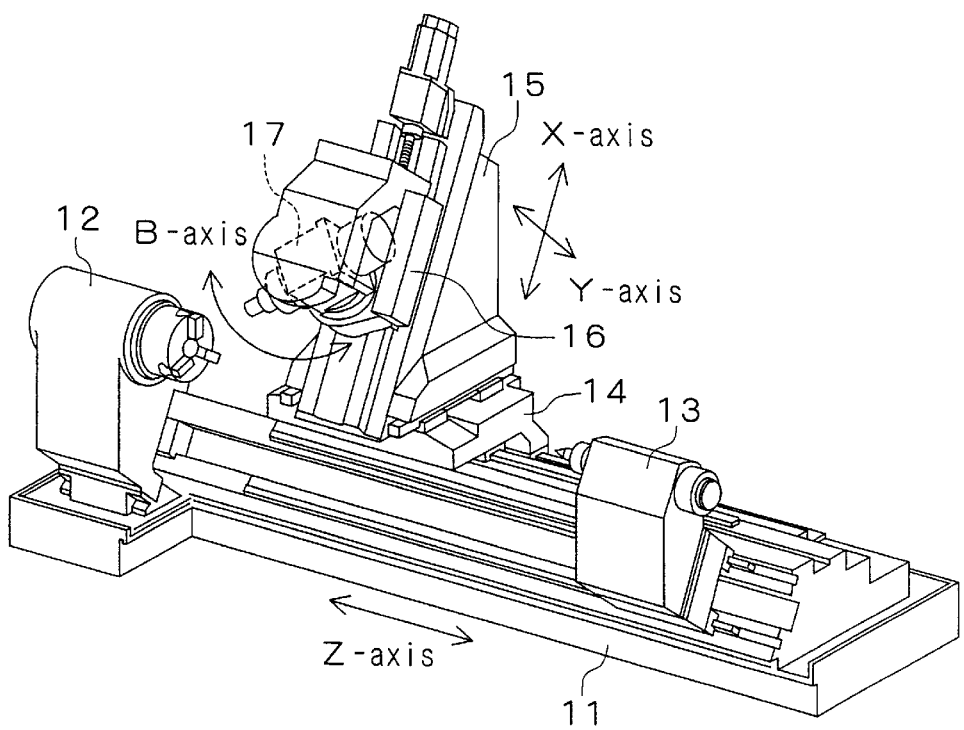
FIG. 3 is a perspective view illustrating the composite lathe having the pivotal tool spindle stock.
Figure 4:
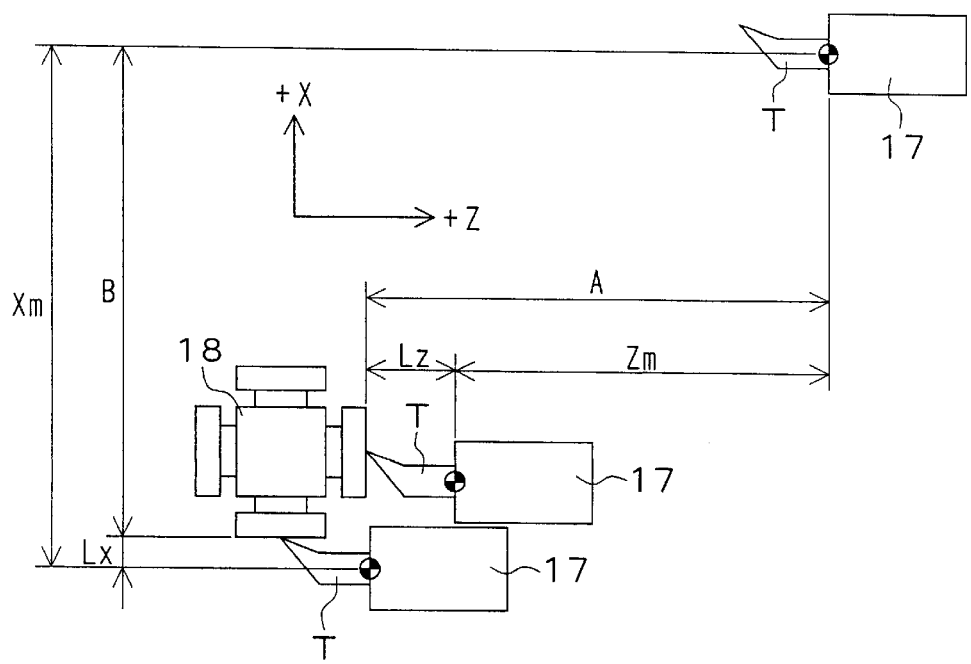
FIG. 4 is a diagram for explaining a tool offset amount calculation method for a conventional tool presetter.
Figure 5A:
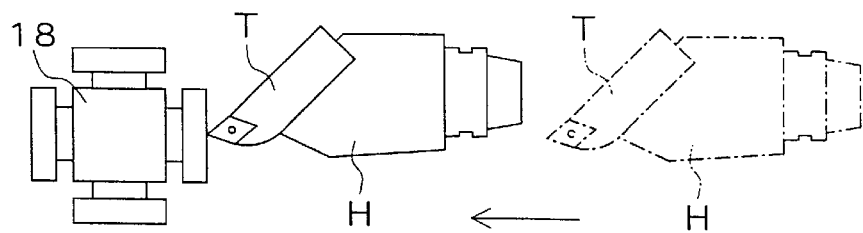
FIGS. 5A and 5B are diagrams for explaining a problem associated with the determination of tool offset amounts by means of the conventional tool presetter.
Figure 5B:
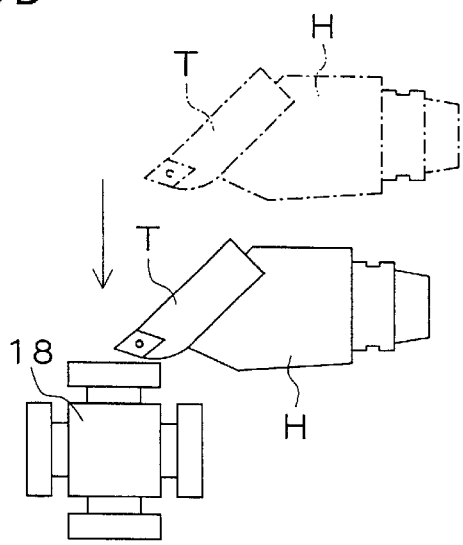
Figure 6:
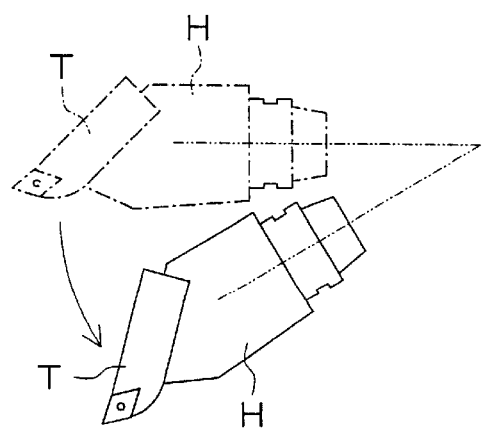
FIG. 6 is a schematic diagram illustrating a state of a tool observed when a tool spindle stock is pivoted.
Figure 7A:
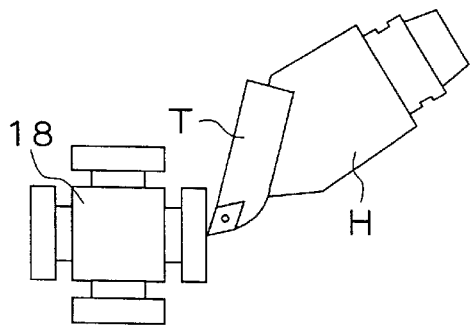
FIGS. 7A and 7B are diagrams for explaining how to bring a tool nose into contact with a presetter sensor by pivoting the tool spindle stock.
Figure 7B:
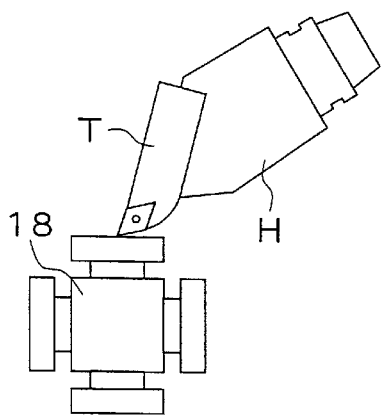
Figure 8:
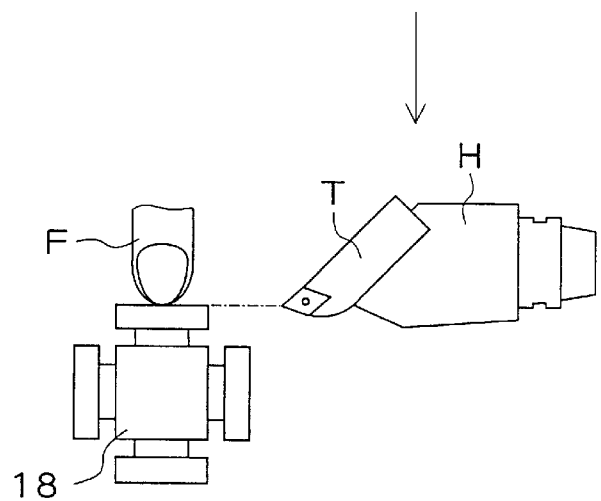
FIG. 8 is a schematic diagram for explaining a tool presetting operation for determining a tool offset amount by means of the conventional tool presetter.

An embodiment of the present invention will hereinafter be described with reference to the attached drawings. As shown in FIG. 1, a composite lathe as shown in FIG. 3 includes drive mechanisms 20 for moving a tool spindle stock 17 along the Z-axis and the X-axis and pivoting the tool spindle stock 17 about a B-axis, an NC (numerical controller) 30 and a PLC (programmable controller) 40 for controlling the drive mechanisms 20, an operation panel 50 for operating the drive mechanisms 20 via the NC 30 and the PLC 40, display means 60 for displaying machine coordinate values of the tool spindle stock 17 and the like, and a presetter sensor 18. The N.C. 30, the PLC 40, the display means 60 and the presetter sensor 18 constitute a tool presetter.

The drive mechanisms 20 each include a servo motor 21 for driving the tool spindle stock 17, a servo amplifier 22 for controlling the operation of the servo motor 21, a speed detector (tachometer generator) 23 for detecting the rotation speed of the servo motor 21, and a position detector (encoder) 24 for detecting the rotational position of the servo motor 21. The drive mechanisms 20 are respectively provided for the X-axis, the Z-axis and the B-axis for moving the tool spindle stock 17 along the X-axis and the Z-axis and pivoting the tool spindle stock 17 about the B-axis.

The drive mechanisms 20 together with controllers 32 to be described later constitute a servo mechanism of a so-called semi-closed loop type, which is adapted to feed back speed detection signals detected by the speed detectors 23 to the servo amplifiers 22 and to feed back position detection signals detected by the position detectors 24 to the controllers 32.

The operation panel 50 includes a mode selection switch for selecting a control mode for the driving mechanisms 20, an axis selection switch for selecting a drive axis to be employed for manually traversing or pivoting the tool spindle stock 17, a pulse handle for manually controlling the movement of the tool spindle stock 17, and an override switch for selecting a factor of the movement of the tool spindle stock 17 with respect to a pulse to be outputted from the pulse handle from preset values.

The PLC 40 performs basic functional control operations for the lathe, e.g., for controlling various interlocking operations and the driving of a main spindle and the tool spindle, and auxiliary functional control operations for the lathe, e.g., for controlling fixtures to be provided in the lathe in accordance with a workpiece and a machining process, a coolant supplying device, a chip removing device and a workpiece loading and unloading device. The PLC 40 receives the signals from the mode selection switch, the axis selection switch and the override switch, and outputs the signals to the NC 30 on an "as is" basis or after subjecting the signals to predetermined processes.

The NC 30 numerically controls the respective drive mechanisms 20 on the basis of a machining program, MDI data, a manual rapid feeding signal, a manual pulse signal and the like. The NC 30 includes: a signal processing section 31 which receives the signals outputted from the operation panel 50 via the PLC 40, a skip signal outputted from the presetter sensor 18 and the position detection signals outputted from the position detectors 24 of the respective drive mechanisms 20; the controllers 32 provided for the respective drive mechanisms 20; a distributing section 33 which outputs traversing command signals and a pivoting command signal for the tool spindle stock 17 to the corresponding controllers 32 on the basis of the signals inputted to the signal processing section 31 via the PLC 40; and a storage section 34 for storing various data.

The signal processing section 31 constantly calculates machine coordinate values of the tool spindle stock 17 on the basis of the position detection signals inputted from the position detectors 24 of the respective drive mechanisms 20 to output the machine coordinate values to the display means 60 during the axial movement of the tool spindle stock 17 in a tool presetting operation, and outputs the skip signal inputted from the presetter sensor 18 to the display means 60 when the presetter sensor 18 detects a nose of the tool T attached to the tool spindle stock 17.

In response to the input of the skip signal, the signal processing section 31 forcibly stops the output of the traversing command signals for the tool spindle stock 17 to the distributing section 33 to stop the axial movement of the tool spindle stock 17. At this time point, the signal processing section 31 calculates reference tool offset amounts on the basis of the machine coordinate values calculated on the basis of the position detection signals outputted from the position detectors 24 and a pivot angle of the tool spindle stock 17, and stores the reference tool offset amounts in a tool offset amount storage area 34a of the storage section 34.

Figure 2A:
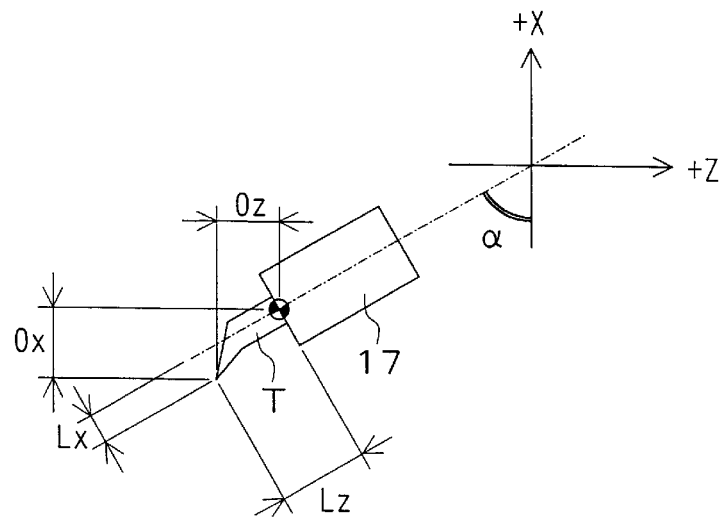
FIGS. 2A and 2B are diagrams for explaining a tool offset amount calculation method for the tool presetter.
Figure 2B:
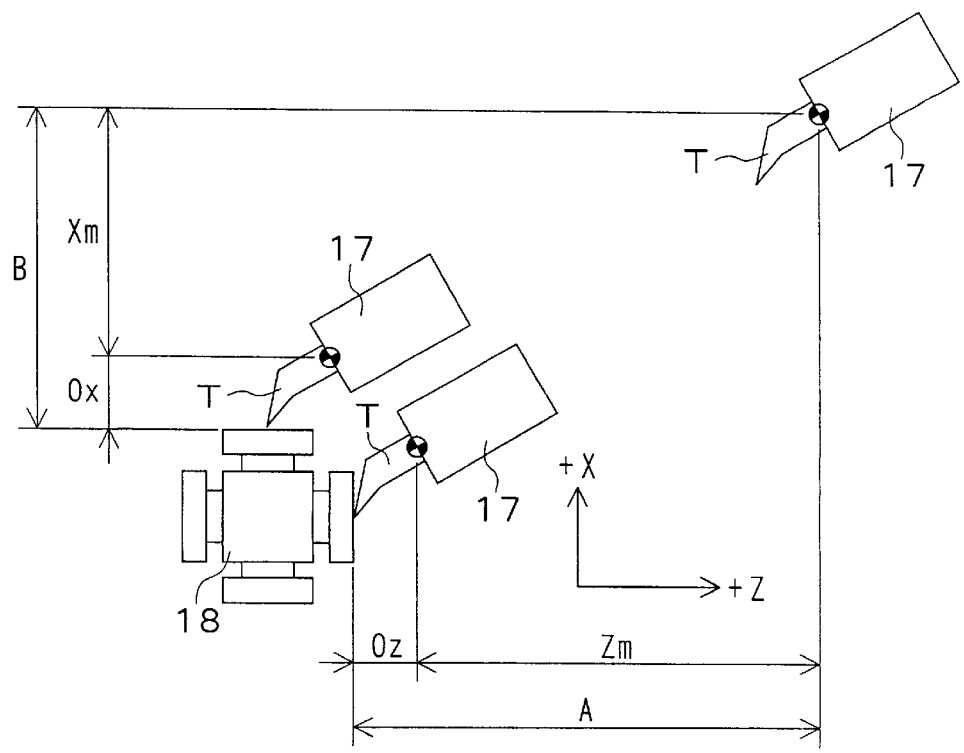

For example, it is herein assumed that machine coordinate values Zm, Xm of the tool spindle stock 17 are detected when the nose of the tool T is in contact with detection points of the presetter sensor 18 with the tool spindle stock 17 pivotted by a pivot angle a as shown in FIGS. 2A and 2B. Tool offset amounts Oz (=A−Zm) and Ox (=B−Xm) respectively calculated on the basis of the machine coordinate values Zm and Xm and the machine coordinate values A and B of the Z-axis and X-axis detection points are employed when a machining operation is performed with the tool spindle stock 17 pivoted by the pivot angle a and, therefore, are different from intended reference tool offset amounts Lz, Lx, i.e., tool offset amounts Ozb (=Lz), Oxb (=Lx) as measured when the nose of the tool T is in contact with the detection points of the presetter sensor 18 with the tool spindle stock 17 pivoted by −90 degrees.

Therefore, the reference tool offset amounts Lz, Lx are calculated from the following expressions (1) on the basis of the calculated tool offset amounts Ox, Oz and the pivot angle α of the tool spindle stock 17, and stored in the tool offset amount storage area 34a.

$$Oxb = \frac{-Ox/2 \times \sin\alpha - Oz \times \cos\alpha}{\sin^2\alpha + \cos^2\alpha} \quad (1)$$

$$Ozb = \frac{Ox/2 \times \cos\alpha - Oz \times \sin\alpha}{\sin^2\alpha + \cos^2\alpha}$$

$$Lx = Oxb \times 2$$

$$Lz = Ozb$$

As described above, the X-axis tool offset amount is on a diametrical basis in the lathe system, so that Oxb ×2 is stored as the X-axis reference tool offset amount Lx in the tool offset amount storage area 34a.

Where the workpiece is machined with the tool spindle stock 17 pivoted by a pivot angle β, therefore, the tool offset amounts Oz, Ox (Ox×2 in practical applications) are automatically calculated from the following expressions (2) on the basis of the reference tool offset amounts Lz, Lx stored in the tool offset amount storage area 34a and the pivot angle β of the tool spindle stock 17. Thus, the composite lathe is operated in consideration of the tool offset amounts Oz, Ox.

$$Ox = Lz \times \cos\beta - Lx \times \sin\beta \quad (2)$$

$$Oz = -Lz \times \sin\beta - Lx \times \cos\beta$$

As described above, the Z-axis and X-axis reference tool offset amounts Lz, Lx as measured with the tool spindle stock 17 being set to position the tool spindle parallel to the Z-axis are calculated on the basis of the machine coordinate values Zm, Xm detected when the tool nose is in contact with the presetter sensor 18 and the pivot angle α of the tool spindle stock 17 detected when the tool nose is in contact with the presetter sensor 18 in the tool presetter. Therefore, there is no need to set the tool spindle stock 17 to position the tool spindle parallel to the Z-axis when bringing the tool nose into contact with the presetter sensor 18.

Even in the case of a tool T having a shape such that a tool nose thereof cannot be brought into contact with the presetter sensor 18 with the tool spindle stock 17 being set to position the tool spindle parallel to the Z-axis, the reference tool offset amounts can easily be determined by pivoting the tool spindle stock 17 to bring the tool nose into contact with the presetter sensor 18 and performing an ordinary presetting operation. Accordingly, there is no need to perform the troublesome operation for checking and modifying the determined reference tool offset amounts, unlike the conventional tool presetter which cannot properly determine the reference tool offset amounts unless the tool spindle stock is set to position the tool spindle parallel to the Z-axis. Thus, the reference tool offset amounts can easily and accurately be determined in a short time irrespective of the shape of the tool T attached to the tool spindle stock 17.

Although the reference tool offset amounts Lz, Lx are respectively defined as the dimensions of the tool as measured along the Z-axis and X-axis when the tool spindle stock 17 is set to position the tool spindle parallel to the Z-axis in the tool presetter, the definition of the reference tool offset amounts is not limited thereto. For example, the reference tool offset amounts may be defined as differences between dimensions of a reference tool and dimensions of an object tool as measured along the Z-axis and the X-axis when the tool spindle stock 17 is set to position the tool spindle parallel to the Z-axis.

While the explanation has thus been given to the tool presetter mounted in the composite lathe having the pivotal tool spindle stock in the aforesaid embodiment, the tool presetter and the tool offset amount calculation method according to the present invention are applicable not only to the composite lathe but also to various types of machine tools having a pivotal tool spindle stock.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A tool presetter to be mounted in a machine tool having a pivotal tool spindle stock, the tool presetter comprising:
   a presetter sensor provided at a predetermined position; and
   control means which determines machine coordinate values of the tool spindle stock when a nose of a tool attached to the tool spindle stock is in contact with the presetter sensor and, on the basis of the machine coordinate values and a pivot angle of the tool spindle stock detected when the tool nose is in contact with the presetter sensor, calculates a reference tool offset amount as measured along an axis with the tool spindle stock being set to position a tool spindle parallel to the axis.

2. A tool presetter as set forth in claim 1, further comprising display means for displaying the machine coordinate values of the tool spindle stock which are outputted from the control means.

3. A tool presetter as set forth in claim 1, wherein the control means comprises a storage section for storing the calculated reference tool offset amount.

4. A tool presetter as set forth in claim 1, wherein the control means calculates, as the reference tool offset amount, dimensions of the tool as measured along a Z-axis and an X-axis when the tool spindle stock is set to position the tool spindle parallel to the Z-axis.

5. A tool presetter as set forth in claim 1, wherein the control means calculates, as the reference tool offset amount, differences between dimensions of a reference tool and dimensions of an object tool as measured along a Z-axis and an X-axis when the tool spindle stock is set to position the tool spindle parallel to the Z-axis.

6. A tool offset amount calculation method for use in a machine tool having a pivotal tool spindle stock to which a tool is attached, the method comprising the steps of:

if it is impossible to bring a nose of the tool into contact with a presetter sensor provided at a predetermined position with the tool spindle stock being set to position a tool spindle parallel to an axis, determining machine coordinate values of the tool spindle stock when the tool nose is in contact with the presetter sensor after the tool spindle stock is pivoted by a pivot angle from a position at which the tool spindle is parallel to the axis to bring the tool nose into contact with the presetter sensor; and calculating a reference tool offset amount as measured along the axis with the tool spindle stock being set to position the tool spindle parallel to the axis on the basis of the machine coordinate values and the pivot angle of the tool spindle stock.

7. A method as set forth in claim 6, wherein the reference tool offset amount to be calculated is dimensions of the tool as measured along a Z-axis and an X-axis when the tool spindle stock is set to position the tool spindle parallel to the Z-axis.

8. A method as set forth in claim 6, wherein the reference tool offset amount to be calculated is differences between dimensions of a reference tool and dimensions of an object tool as measured along a Z-axis and an X-axis when the tool spindle stock is set to position the tool spindle parallel to the Z-axis.

* * * * *